June 22, 1943.  W. H. DE LANCEY  2,322,569
MECHANICAL MOVEMENT FOR SHIFTING GEARS
Filed Dec. 29, 1941  2 Sheets-Sheet 1

INVENTOR
WARREN H. DELANCEY
BY
Chapin + Neal
ATTORNEYS

June 22, 1943.  W. H. DE LANCEY  2,322,569
MECHANICAL MOVEMENT FOR SHIFTING GEARS
Filed Dec. 29, 1941  2 Sheets-Sheet 2
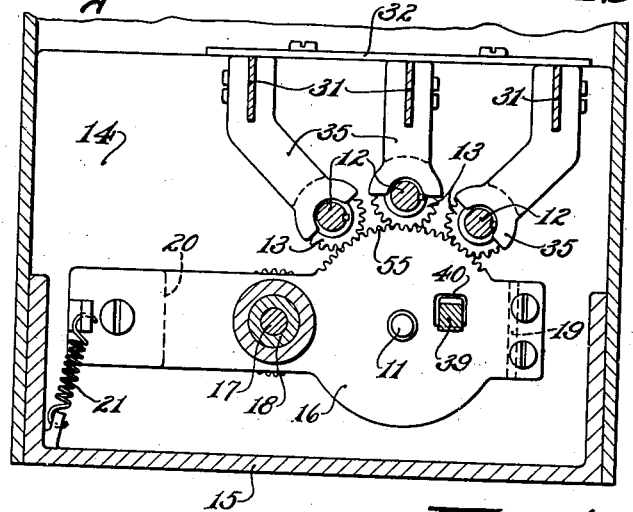
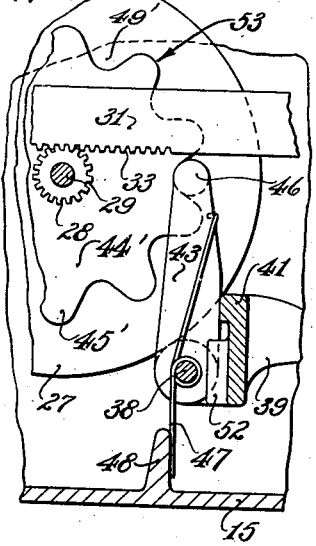
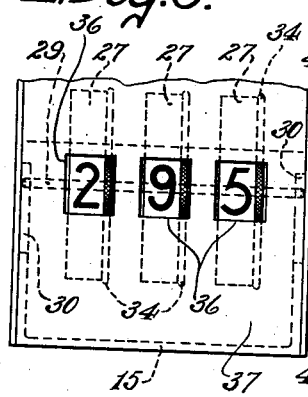
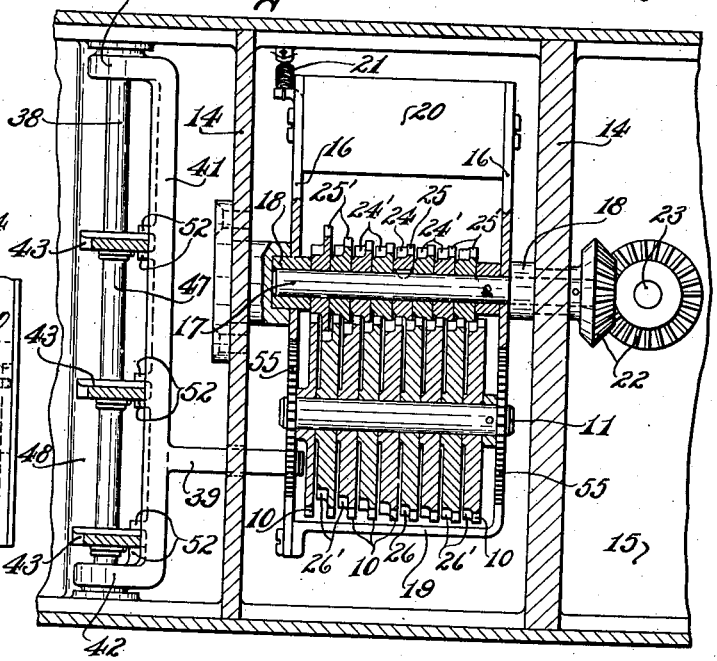
INVENTOR
WARREN H. DeLANCEY
BY
Chapin + Neal
ATTORNEYS Patented June 22, 1943

2,322,569

UNITED STATES PATENT OFFICE 2,322,569

MECHANICAL MOVEMENT FOR SHIFTING GEARS

Warren H. De Lancey, Springfield, Mass., assignor to Gilbert & Barker Manufacturing Company, West Springfield, Mass., a corporation of Massachusetts Application December 29, 1941, Serial No. 424,764

7 Claims. (Cl. 74—342)

This invention relates to improved mechanical movements for shifting gears, such for example as the gears of a transmission.

The invention has for an object the provision of coordinated means for moving a shiftable gear along the gears of a gear set to selectively engage it with any gear of said set and also for effecting the unmeshing of the shiftable gear from the gear set near the start of said selective movement and meshing it with the gear set near the end of such selective movement.

The invention also has for an object the provision of a plurality of shiftable gears, each selectively engageable with the gears of a gear set, and means for unmeshing the gear set from all the shiftable gears during the initial part of the selective shifting movement of any one thereof and for remeshing the gear set and all the shiftable gears during the latter part of the selective movement of any one of such shiftable gears.

The invention will be disclosed with reference to the accompanying drawings, in which.

Figure 2:
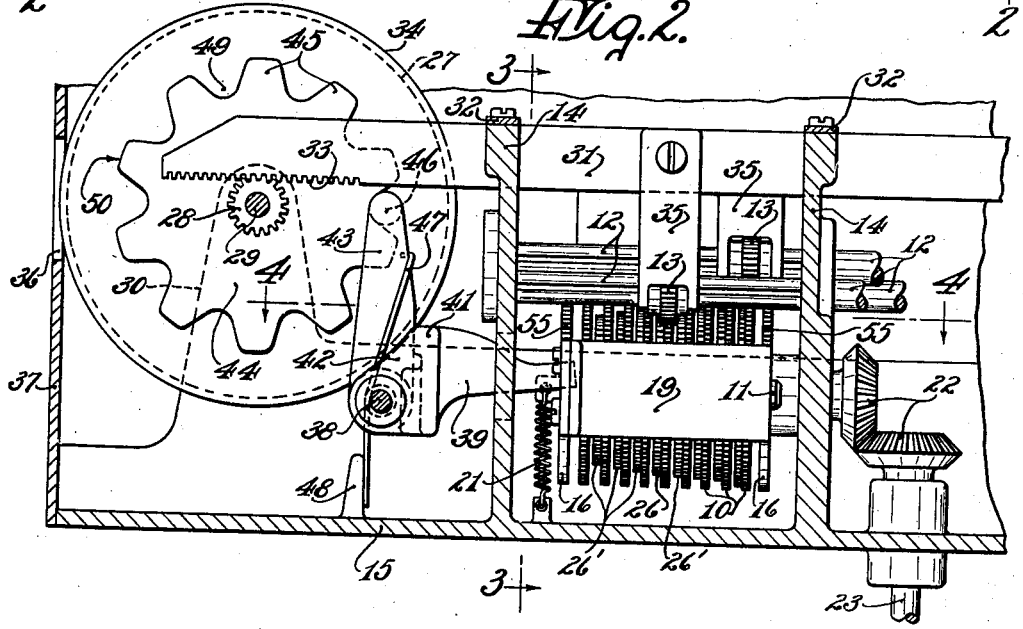
Fig. 2 is a sectional elevational view thereof taken on the line 2—2 of Fig. 1.

Figs. 3 and 4 are sectional views taken on the lines 3—3 and 4—4, respectively, of Fig. 2;

Fig. 5 is a fragmentary exterior front elevational view of the casing of the transmission; and Fig. 6 is a fragmentary sectional elevational view, taken similarly to Fig. 2 but showing a modification in detail.

Figure 1:
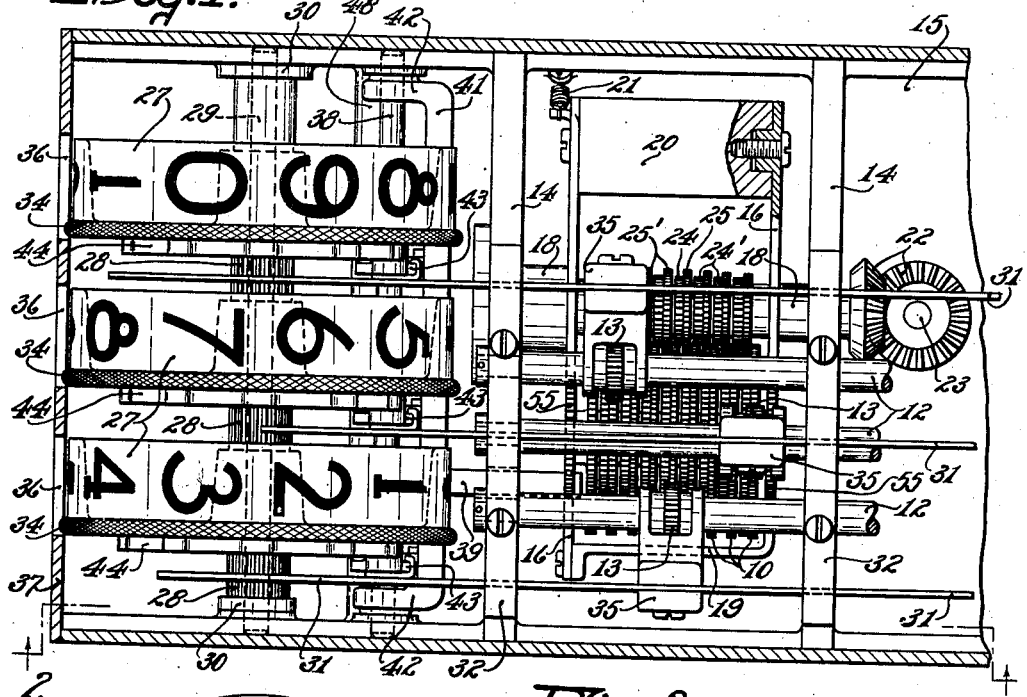
Fig. 1 is a top plan view of a transmission embodying the gear shifting means of this invention—the casing of the transmission being shown in section.

Referring to these drawings, there is shown in Figs. 1 and 2 a gear set consisting of a plurality of gears 10 all of the same pitch diameter and mounted on a common axis for rotation, the one independently of the other, at different speeds. Above this gear set are a plurality of splined shafts 12, paralleling the axis of gears 10 and each carrying a shiftable gear 13 which is slidably but non-rotatably engaged therewith. Each gear 13 can be slid along its shaft 12 from any one gear 10 of the gear set to any other gear 10 of such set. These shafts 12 are mounted in suitable bearings in two spaced parallel walls 14 upstanding from the bottom wall 15 of the frame of the transmission and are suitably held, as indicated in Fig. 1, against axial movement.

The gear set is mounted for bodily movement in a direction toward and away from the shafts 12 or substantially radially of the gears 10 of such set. This enables all of the shiftable gears 13 to be moved into and out of mesh with any gears 10 of the set. As shown in Fig. 4, a shaft 11, which carries all the gears 10, is mounted at its ends in the spaced parallel side plates 16 of a frame. This frame is pivotally mounted on a shaft 17, mounted in bearings 18 in said upstanding walls 14 and is held against axial movement by abutment with the adjacent end faces of said bearings. The frame of the gear set further includes an end plate 19 which ties together the front ends of the side plates 16 and a counterweight 20 which ties together the rear end of plates 16 and also serves to balance the weight of the gears 10 and the other gears to be described which are also supported in this frame. A spring 21, connecting base 15 to the rear end of one of the side plates 16 serves to raise the gears 10 into position to mesh with all the shiftable gears 13.

The teeth of the gears 10 and 13 are preferably formed with a relatively high pressure angle (substantially 30 degrees, for example) to give them a contour that will enable them to easily go into mesh.

The gears 10 may be driven in any suitable way. For example, the pivot shaft 17 (Fig. 4), which is driven by bevel gears 22 from a main drive shaft 23, mounted in part in base 15, has keyed thereto a pinion 24 which meshes with and drives the fifth gear 10 (counting from the left in Fig. 4) of the gear set. Fixed to pinion 24 is a pinion 25 which drives a gear 26 fixed to the sixth gear 10. Loose on shaft 17 are other pinions 24', each meshing with a gear 10, and fixed to each pinion 24' is a pinion 25' of different size. Each gear 10, except the first of the series, has fixed thereto a gear 26' meshing with one of the pinions 25'. As will be clear from Fig. 4, all the gears 10, 26 and 26' and pinions 24, 25, 24' and 25' are connected in a series, so that all are driven from the pinion 24—25 which is keyed to shaft 17. The arrangement is such that the gears 10 move at different speeds.

Referring now to Figs. 1 and 2, means are provided for sliding the gears 13 axially along their shafts 12, which in this case may be assumed to be the driven shafts of the transmission. For each shiftable gear 13, there is provided a rotatable member, preferably a number wheel 27, adapted to be manually actuated to shift the gear and at the same time to indicate the position of the gear 13 with respect to the gear set. Each wheel 27 has fixed thereto a pinion 28. These wheels with their attached pinions are loosely mounted on a shaft 29, mounted at its ends in bearing brackets 30 upstanding from base 15. Slidably mounted in slots formed in the tops of walls 14 are shifter bars 31, one for each gear 13. Gibs 32, one for each wall 14, serve to hold bars 31 in place. The forward ends of these bars 31 are provided with sets of rack teeth 33, which mesh one set with each pinion 28. By turning the handwheels 27, which may conveniently be done by means of the knurled edge 34, the bars 31 may be reciprocated. Each bar 31 has fixed thereto a shifter 35 which is forked to straddle its gear 13 and also the shaft 12 on which said gear is slidable. Thus, the gears 13 may be moved from one gear 10 to another of the gear set by means of the handwheels 27.

Each handwheel (Fig. 1) is provided with suitable designations on its periphery to be successively displayed through windows 36 in the front wall 37 of the housing for the transmission (see also Fig. 5). This housing has been shown in part only, as it is not a necessary element of the invention. In this particular case, each wheel 27 is provided with the series of numbers 0, 1, 2, 3, 4, 5, 6, 7, 8, 9. The zero indicates an inactive position of a gear 13. The other numerals designate the number of the gear 10 with which it is engaged, as the first, second, third and so forth, counting from left to right as viewed in Figs. 1, 2 and 4. For example, when the lowermost number wheel of Fig. 1 is turned so that the number 5 shows in its window 36, the gear 13 will have been shifted into position to engage the fifth gear 10.

The means for bodily shifting the set of gears 10 will next be described with reference to Figs. 1, 2 and 4. Upon a shaft 38, which parallels shaft 29 and is supported at its ends in a similar manner, is loosely mounted a bellcrank having an arm 39 which extends through an opening in the adjacent wall 14 and into a hole 40 (see Fig. 3) in the nearest side plate 16. Turning this bellcrank clockwise as viewed in Fig. 2, will move the frame bearing the gear set so as to withdraw the gears 10 from all the gears 13. The bellcrank includes a long cross bar 41, to which at a point intermediate its ends the arm 39 is attached and which, at each end has a short arm 42 pivotally mounted on shaft 38. Also loosely mounted on shaft 38 are a plurality of arms 43, one for each number wheel 27. These number wheels have fixed, one to each thereof, a star wheel 44, which provides a circular series of cam projections 45, one for each number on wheel 27. Each arm 43 carries on its upper end a roll 46 to ride on the star wheel. A spring 47, having a turn around shaft 38 has one end engaged with an arm 43 and the other end bearing against a lug 48 upstanding from base 15. The springs 47 hold the rolls 46 of arms 43 engaged with the star wheels.

Normally, these rolls 46 lie in the bottoms of the recesses 49 (Fig. 2), provided one between each pair of cam projections 45, and hold the number wheels so positioned that one number of each registers properly in its window 36, as shown in Fig. 5. When a number wheel is turned (see Fig. 2), one or the other of the sloping sides of a cam projection 45 (depending on which way the wheel is turned) forces the roll 46 radially outwardly, thus moving its arm 43 against the cross bar 41 of the bellcrank and causing the frame of the gear set to be rocked so as to unmesh gears 10 from all the gears 13. It will be clear that each number wheel, when turned, will serve to move the bellcrank in the same way to unmesh gears 10. At the same time that the gears 10 are moved out of mesh with gears 13, one of the gears 13 will be moving in an axial direction in the path that is to carry it from one gear 10 to another, but it will not move far enough to abut the next gear 10 before complete unmeshing of gears 10 and 13 occurs. The gear 13 moves out of position to engage one gear 10 and into position to engage another gear 10 during the time that a roll 46 rides on the concentric dwell portion 50 of a cam projection 45. Also, the remeshing of gears 10 with gears 13 occurs at the latter part of the axial travel of gears 13 and after a gear 13 has been moved into the proper axial position to engage the selected gear 10.

The several arms 43 are held in proper axial position on shaft 38 by pairs of spaced lugs 52— one pair for each arm. As will be clear from Fig. 4, a portion of the hub of each arm 43 lies between a pair of these lugs and is thereby held against axial movement on the shaft. Any other suitable means may be provided for this purpose.

A slightly different form of star wheel 44' is shown in Fig. 6. Here, the cam projections 45' have their outer ends rounded as at 53, and thus devoid of any dwell surfaces such as those on star wheels 44. With this arrangement, the rolls 46 will always come to rest in the base of the notches 49'. If the operator does not turn the number wheel 27 far enough for the purpose, the spring 47 acting on arm 43 will force roll 46 along the cam surface of projections 45' and turn the number wheel into the proper rest position. If the cam projections are long enough radially to move the gears 10 not only into a position wherein they are out of mesh with gears 13, but beyond such position, then dwell surfaces on these cam projections can be dispensed with.

If it is desired to have any one of the shafts 12 inactive, its gear 13 is shifted so that it meshes with one or the other of two gear segments 55 (Figs. 2, 3 and 4), provided one on each end plate 16 of the frame of the gear set. When a gear 13 is thus positioned, its number wheel is so positioned that zero appears in the appropriate window 36 and the shaft 12 will be held against rotation.

The operation will be clear from the foregoing description. One simply turns one or more of the number wheels 27 until the numbers of the desired gears appear in the windows 36. By the act of turning these indicator wheels the gears 13 are shifted into proper axial position to engage the desired gears 10. At the same time, the gear set is moved out of meshing position with respect to gears 13, while the latter are being shifted from one gear 10 to the next and moved back into mesh with gears 13 after the latter have been properly positioned to mesh with the selected gears 10. The arrangement enables the two necessary movements, unmeshing of gears 10 and 13 and relative axial shifting of these gears to be effected by actuation of a single actuator. Furthermore, the arrangement insures that all the gears 13 are moved out of mesh with the gears 10 even though only one gear 13 is to be shifted. Before any change in setting of the gears can be effected, all the driven shafts 12 are made inoperative. One cannot operate the transmission unless each of the gears 13 has been moved into some one of its predetermined axial operating positions.

What I claim is:

1. In combination, a gear set consisting of a plurality of gears, a plurality of shiftable gears each selectively engageable with the gears of said set, means one for each shiftable gear for moving such gear from one selected gear of said set to another, and a single means operable on actuation of any of the first-named means and during the initial and latter part of the movement thereof to respectively unmesh and mesh the gear set from and with all said shiftable gears.

2. In combination, a gear set comprising a plurality of gears of equal pitch diameter moving at different speeds about a common axis, a shiftable gear selectively engageable with the gears of said set, means for moving the shiftable gear in a straight line path parallel to said axis to effect the selective engagement, means for bodily moving said gear set in a path substantially radially thereof to unmesh the shiftable gear from one selected gear of said set at the start of its selective movement and to mesh the shiftable gear with another selected gear of said set at the end of such movement, and a single means for actuating both said first-named means and second-named means in proper sequence.

3. In combination, a gear set comprising a plurality of gears of equal pitch diameter moving at different speeds about a common axis, a gear selectively engageable with the gears of said set and slidable in a path parallel to said axis to effect the selective engagement, said gear set being bodily movable in a substantially radial path into meshing and unmeshing relation with said slidable gear, and a single means for moving said slidable gear and said set in their respective paths and in coordinated relation, whereby to unmesh the slidable gear from one gear of said set during the initial part of its movement from one gear to another of said set and to mesh the slidable gear with the last-named gear of said set during the latter part of said movement.

4. In combination, a gear set comprising a plurality of gears of equal pitch diameter moving at different speeds about a common axis, a plurality of shiftable gears each selectively engageable with the gears of said set, means one for each shiftable gear for moving such gear in a path parallel to said axis to effect the selective engagement, and means operable on actuation of any one of the first-named means and during the initial part of the movement thereof to move said gear set out of mesh with all the shiftable gears and during the latter part of such movement to move said gear set into mesh with all the shiftable gears.

5. In combination, a plurality of gears forming a set, a plurality of shiftable gears each selectively engageable with the gears of said set, a plurality of rotatable number wheels one for each shiftable gear for indicating the gear of said set with which its shiftable gear is engaged, connections between each number wheel and its shiftable gear for moving the latter from one gear to another of said set while the wheel turns from one number to another, and means actuated by rotation of any number wheel to unmesh and mesh the gear set from all the shiftable gears near the start and near the end respectively of the movement of its shiftable gear from one gear to another of said set.

6. In combination, a plurality of gears forming a set, a plurality of shiftable gears each selectively engageable with the gears of said set, a plurality of rotatable number wheels one for each shiftable gear for indicating the gear of said set with which its shiftable gear is engaged, connections between each number wheel and its shiftable gear for moving the latter from one gear to another of said set while the wheel turns from one number to another, a cam fixed to each number wheel, a follower for each cam, and connections between each follower and said gear set for bodily moving the set out of mesh with all shiftable gears and into mesh with the same near the start and near the end of the movement of a shiftable gear from one gear of said set to another.

7. In combination, a gear set consisting of a plurality of gears of equal pitch diameter mounted on a common axis for rotation at different speeds, a plurality of shafts parallel to said axis, shiftable gears one for each shaft and slidably but non-rotatably engaged therewith, each shiftable gear being selectively engageable with the gears of said set and slidable on its start to effect the selective engagement, a frame supporting said gear set and bodily movable away from and toward said shafts to respectively carry it into unmeshing and meshing relation with all the shiftable gears, individual means including a rotatable actuating member for sliding each shiftable gear from one gear to another of said set, a cam fixed to each said member, a follower for each cam, a member located in the path of each follower and engageable and movable in one direction by any one thereof, yieldable means for moving the last-named member in the opposite direction, and connections between the last-named member and said frame for bodily moving the latter.

WARREN H. DE LANCEY.

CERTIFICATE OF CORRECTION.

Patent No. 2,322,569. June 22, 1943.

WARREN H. DE LANCEY.

It is hereby certified that error appears in the printed specification of the above numbered patent requiring correction as follows: Page 3, second column, line 38, claim 7, for "start" read --shaft--; and that the said Letters Patent should be read with this correction therein that the same may conform to the record of the case in the Patent Office.

Signed and sealed this 27th day of July, A. D. 1943.

(Seal)

Henry Van Arsdale,
Acting Commissioner of Patents.